W. J. DALY & B. WIMMER.
CLOTHES LINE SUPPORT.
APPLICATION FILED NOV. 27, 1914.
1,130,713.
Patented Mar. 9, 1915.
2 SHEETS—SHEET 1.
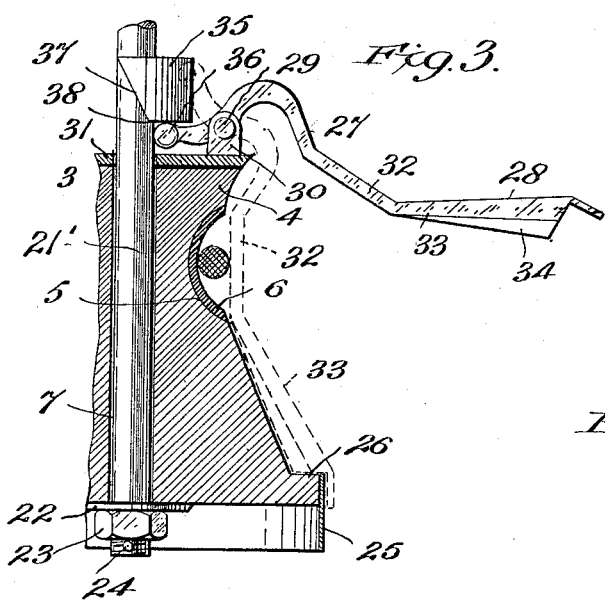
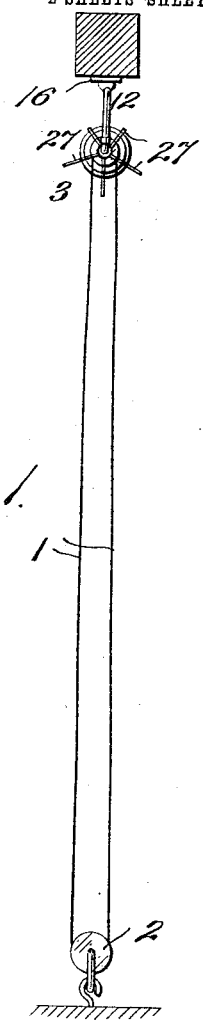
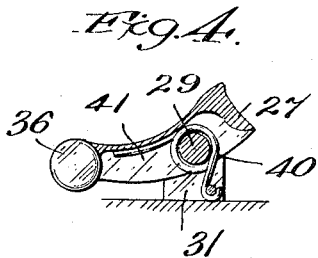
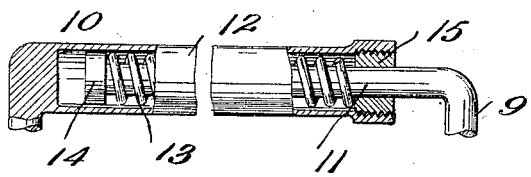
WITNESSES:
M. E. Laughlin
D. W. Smyth
INVENTORS
Walter J. Daly +
Bernhard Wimmer,
BY
Geo. A. Byrne
ATTORNEY
THE NORRIS PETERS CO., PHOTO-LITHO., WASHINGTON, D. C.

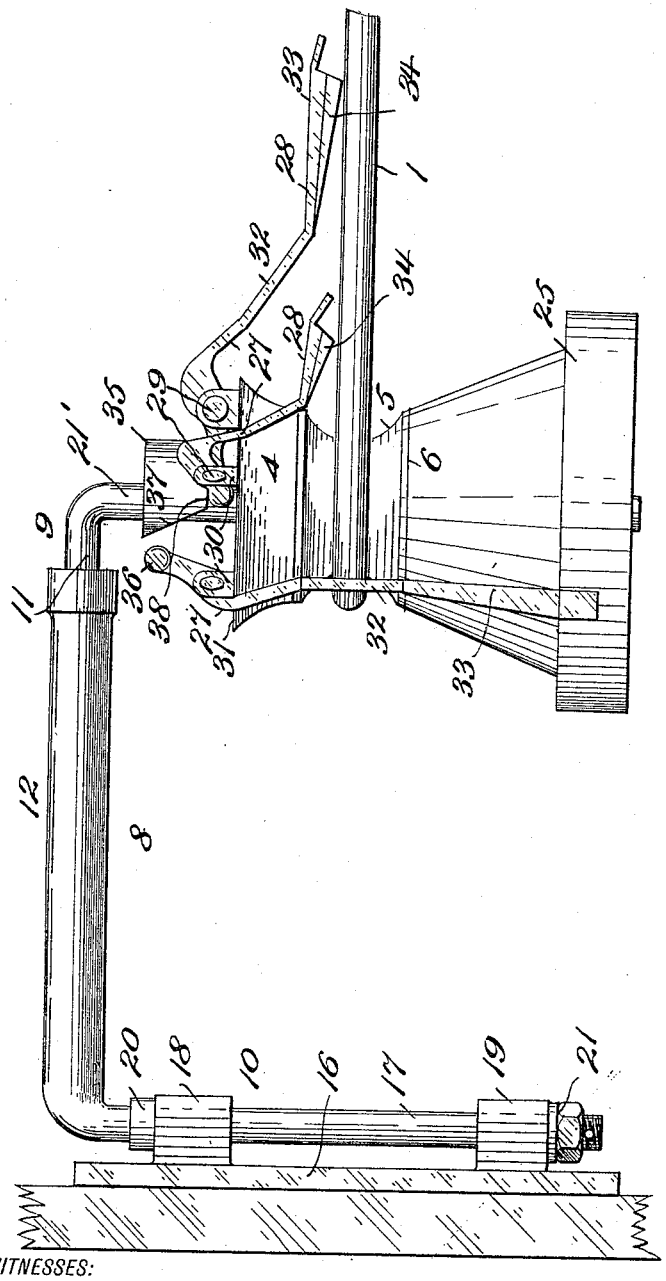

UNITED STATES PATENT OFFICE.

WALTER J. DALY AND BERNHARD WIMMER, OF RAHWAY, NEW JERSEY.

CLOTHES-LINE SUPPORT.

1,130,713.  Specification of Letters Patent.  Patented Mar. 9, 1915.

Application filed November 27, 1914. Serial No. 874,316.

*To all whom it may concern:*

Be it known that we, WALTER J. DALY and BERNHARD WIMMER, citizens of the United States, and residents of Rahway, in the county of Union and State of New Jersey, have invented certain new and useful Improvements in Clothes-Line Supports, of which the following is a specification.

The general object of this invention is to permit the use of the whole of an endless clothes line for supporting various articles of clothing, so that the person in placing the clothes upon the line may not be required to change his or her position from that assumed at the outset. And to these ends the invention consists of a grooved line supporting pulley having a series of radially arranged and independently movable keepers which are arranged so as to be thrown into and out of operative engagement with the sides of the pulley when the pulley is revolved, so as to prevent the line from becoming dis-engaged from the pulley.

A further object of the invention is to provide a means whereby the pulley may be yieldingly connected to a suitable support so as to prevent the clothes line from becoming broken under the weight of the clothes hung thereon, and to also compensate for the contraction and expansion of the clothes line due to the conditions of the weather.

Other objects will appear and be better understood from that embodiment of which the following is a specification, reference being had to the accompanying drawings forming a part hereof, in which—

Figure 1 is a plan view of the pulley and line shown in position ready for use. Fig. 2 is an enlarged detail side elevational view of the pulley and the means for supporting the same and also showing a portion of a line passing around the pulley. Fig. 3 is a longitudinal sectional view of a portion of the pulley showing one of the keepers. Fig. 4 is a detail sectional view of a portion of one of the keepers and Fig. 5 is a longitudinal sectional view of a portion of the bracket.

Referring to the drawings in detail, 1 indicates an endless clothes line which by means of an ordinary pulley 2 and our improved pulley 3 may be supported between building, posts or other suitable supporting devices.

The pulley 3 is preferably made of wood, into substantially a conical shape and is surmounted by an enlarged head 4. At the intersection of the cone and head the pulley is formed with a grooved portion 5 which provides a marginal way for the reception of the clothes line and to prevent any tendency of the line slipping or sliding when the pulley is operated the groove is provided with a band of rubber or other suitable material as indicated at 6. The pulley is centrally bored as at 7 so that it may be suspendedly mounted in a horizontal position on one end of an inverted U-shaped swinging bracket 8. This bracket is preferably formed of a pair of angularly shaped arms 9 and 10 which have their horizontally arranged portions 11 and 12 telescopically connected as indicated at 11. The horizontal portion 12 of the bracket 10 is of tubular structure so as to receive a coil spring 13 (see Fig. 5), one end of which abuts a collar 14, fitted on the end of the horizontal portion of the arm 9, and the other end of which abuts against an apertured plug 15 securely held within the end of the tube. By yieldingly connecting the arms of the bracket it is obvious that when the pulley is in use the breaking of the clothes line due to the weight of the clothes hung thereon will be prevented and that the usual contraction and expansion of the line due to condition of the weather may also be compensated for.

The bracket is provided with an attaching plate 16, which by any suitable fastening means, such as screws, nails or the like, may be secured to any suitable support. The inner or angularly shaped arm 10 of the bracket is connected to the attaching plate by means of having its vertically arranged portion formed into a spindle 17 which is mounted in a pair of bearings 18—19 projecting from the face of the attaching plate. Any suitable means may be provided for securing the spindle against vertical movement within the bearings as for instance a collar 20 mounted on the upper end of the spindle and a nut and washer 21 mounted on the lower end of the spindle. The outer or angularly shaped arm 9 has its vertically arranged portion also formed into a spindle 21', for projecting downwardly through the bore of the pulley.

Any suitable means may be provided for holding the pulley upon the spindle, as for instance, a washer 22 and nut 23 secured on the lower end of the spindle. A pin or key 24 passing transversely through the spindle below the nut serves as a means for locking the nut and thus preventing the pulley from becoming accidentally disengaged from the spindle.

To prevent any liability of the clothes becoming torn or soiled, by coming into contact with the lower end of the spindle, the pulley is provided with a guard 25. This guard is preferably formed of a band of rubber or other suitable material and is secured to and projects downwardly from the periphery of a flange or shoulder portion 26 formed on the lower end of the pulley.

To prevent the end of the clothes line from becoming disengaged from the groove of the pulley, a series of movable keepers 27 are provided. These keepers may be formed of any suitable material, are preferably of the shape shown, and comprise a series of fingers 28 which are pivotally connected as at 29 to bearings 30 projecting upwardly from a plate 31 rigidly secured on the upper face of the pulley head 4. These fingers are each provided with a straight portion 32 and an angular portion 33 so that when the fingers are in their lower or pulley engaging position, the straight portions thereof will bridge the groove of the pulley and the angular portion will engage with the conical sides of the pulley; thus it will be obvious that when in the pulley engaging position, the fingers will have a tendency to prevent the line from becoming disengaged from the pulley groove. To prevent the tearing of the clothes and breaking the clothes pins when the pulley is in use, the keepers have the inner faces of their angular portions provided with a strip of rubber or similar substance as indicated at 34.

The keepers are radially arranged on the pulley and are adapted to be raised to their upper position when the pulley is rotated so as not to interfere with the proper working of the line as it enters and leaves the groove of the pulley. To operate the keepers a cam 35 is mounted on the upper end of the spindle 21' and is arranged so as to be operated upon by the upper or headed ends 36 of the keepers. This cam extends part way around the spindle, is preferably of a semi-circular shape and has its ends beveled as at 37 and is provided with a straight bottom portion 38. When the pulley is rotated either to the right or left, the headed ends 36 of the keepers are first brought into contact with the beveled end 37 of the cam thus causing the keepers to be raised to their upper position in which position they are held during a partial rotation of the pulley by means of their heads 36 engaging the straight bottom portion 38 of the cam.

The keepers are spaced on the pulley and so timed by their contact with the cam that as soon as the line comes into contact with the pulley one of the keepers is released thus permitting it to fall to its lower or pulley engaging position. The releasing of the keepers is effected by means of its headed portion passing from under the cam.

Through the action of coil springs 40 (see Fig. 4) mounted within cutaway portions 41 formed in the upper ends of the keepers, the keepers are not only forced to their lower positions but are yieldingly held in this position so that a pressure is normally exerted on the line to maintain it in its groove regardless of any tendency of the clothes or clothes pins to effect the disengagement of the line from the groove other than the usual passage of the clothes and clothes pins around the pulley.

It is obvious that those skilled in the art may vary the details of construction and arrangement of parts without departing from the spirit of our invention and therefore we do not wish to be limited to such features except as may be required by the claims.

What we claim is—

1. In a clothes line support, a bracket, a grooved line supporting pulley rotatably mounted upon the bracket, a series of independently movable keepers mounted on the pulley for normally bridging the groove of the pulley, and a means for operating the keepers to successively move outwardly from the groove for the purpose set forth.

2. In a clothes line support, a bracket, a grooved line supporting pulley rotatably mounted upon the bracket, a series of radially arranged and independently movable keepers mounted on the pulley for normally bridging the groove of the pulley and a means mounted on the bracket for operating the keepers to successively move outwardly from the groove as set forth.

3. In a clothes line support, a bracket, a grooved line supporting pulley rotatably mounted on the bracket, a series of radially arranged and independently movable keepers mounted on the pulley for normally bridging the groove of the pulley, and a cam mounted on bracket for operating the keepers to successively move outwardly from the groove for the purpose set forth.

4. In a clothes line support, a bracket, a grooved line supporting pulley rotatably mounted on the bracket, a series of radially arranged and independently movable keepers pivotally mounted on the pulley for normally bridging the groove of the pulley, and a cam mounted on the bracket for operating the keepers to successively move outwardly from the groove for the purpose set forth.

5. A clothes line support comprising an inverted U-shaped bracket formed of a pair of angularly shaped telescopic members, means for yieldingly connecting said members together, a spindle formed on one of the members, a grooved line supporting pulley rotatably mounted on the spindle, a spindle formed on the other of said members, and an attached plate pivotally mounted on the second mentioned spindle for connecting the bracket to a suitable support, substantially as described.

Signed at the city of Elizabeth in the county of Union and State of New Jersey this thirteenth day of October A. D. 1914.

WALTER J. DALY.
BERNHARD WIMMER.

Witnesses:
DONALD H. McLEAN,
G. BARTRAM WOODRUFF.

Copies of this patent may be obtained for five cents each, by addressing the "Commissioner of Patents, Washington, D. C."